(12) United States Patent
Tsujimura et al.

(10) Patent No.: US 11,532,813 B2
(45) Date of Patent: Dec. 20, 2022

(54) COMPOSITE CATHODE ACTIVE MATERIAL, PREPARATION METHOD THEREOF, CATHODE LAYER INCLUDING THE SAME, AND ALL-SOLID SECONDARY BATTERY INCLUDING THE CATHODE LAYER

(71) Applicant: Samsung Electronics Co., Ltd., Suwon-si (KR)

(72) Inventors: Tomoyuki Tsujimura, Yokohama (JP); Yuichi Aihara, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 221 days.

(21) Appl. No.: 17/106,561

(22) Filed: Nov. 30, 2020

(65) Prior Publication Data
US 2021/0265623 A1    Aug. 26, 2021

(30) Foreign Application Priority Data

Feb. 20, 2020   (JP) ............................ JP2020-027205
Apr. 29, 2020   (KR) ........................ 10-2020-0052880

(51) Int. Cl.
| | | |
|---|---|---|
| H01M 4/36 | (2006.01) |
| H01M 4/62 | (2006.01) |
| H01M 4/505 | (2010.01) |
| H01M 4/525 | (2010.01) |
| H01M 10/0562 | (2010.01) |
| H01M 10/0525 | (2010.01) |
| H01M 4/02 | (2006.01) |

(52) U.S. Cl.
CPC ........... *H01M 4/366* (2013.01); *H01M 4/505* (2013.01); *H01M 4/525* (2013.01); *H01M 4/628* (2013.01); *H01M 10/0525* (2013.01); *H01M 10/0562* (2013.01); *H01M 2004/021* (2013.01); *H01M 2004/028* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 5,773,168 A * | 6/1998 | Kubo | ................... H01M 4/525 29/623.5 |
| 7,993,782 B2 | 8/2011 | Takada et al. | |
| 8,968,939 B2 | 3/2015 | Tsuchida et al. | |
| 9,214,674 B2 | 12/2015 | Yoshida | |
| 9,391,328 B2 | 7/2016 | Tsuchida et al. | |
| 9,692,041 B2 | 6/2017 | Aihara et al. | |

(Continued)

FOREIGN PATENT DOCUMENTS

| | | |
|---|---|---|
| JP | H05-55188 B2 | 8/1993 |
| JP | 2012089406 A | 5/2012 |

(Continued)

*Primary Examiner* — Carlos Barcena
(74) *Attorney, Agent, or Firm* — Cantor Colburn LLP

(57) ABSTRACT

A composite cathode active material includes a cathode active material particle; and a coating layer on a surface of the cathode active material particle, wherein the coating layer includes an acetate, wherein the acetate comprises an alkali metal acetate, an alkaline earth metal acetate, a transition metal acetate, or a combination thereof, or a derivative thereof.

28 Claims, 8 Drawing Sheets

(56) References Cited

U.S. PATENT DOCUMENTS

| | | |
|---|---|---|
| 9,843,038 B2 | 12/2017 | Yamada et al. |
| 9,853,323 B2 | 12/2017 | Visbal et al. |
| 10,141,566 B2 | 11/2018 | Fujiki et al. |
| 10,340,506 B2 | 7/2019 | Aihara et al. |
| 10,873,084 B2 | 12/2020 | Ito et al. |
| 2013/0309580 A1 | 11/2013 | Tomura |
| 2013/0316237 A1* | 11/2013 | Miki .................. H01M 4/525 427/58 |
| 2014/0227578 A1 | 8/2014 | Yoshida |
| 2014/0227606 A1 | 8/2014 | Suzuki et al. |
| 2014/0287324 A1 | 9/2014 | Tsuchida et al. |
| 2016/0079597 A1 | 3/2016 | Fujiki et al. |

FOREIGN PATENT DOCUMENTS

| | | |
|---|---|---|
| JP | 2012243443 A | 12/2012 |
| JP | 5287739 B2 | 6/2013 |
| JP | 5455766 B2 | 1/2014 |
| JP | 2014116129 A | 6/2014 |
| JP | 2014116149 A | 6/2014 |
| JP | 5578280 B2 | 7/2014 |
| JP | 201572772 A | 4/2015 |
| JP | 2015072818 A | 4/2015 |
| JP | 201588383 A | 5/2015 |
| JP | 2015201372 A | 11/2015 |
| JP | 201624907 A | 2/2016 |
| JP | 201642417 A | 3/2016 |
| JP | 201662683 A | 4/2016 |
| JP | 2016081822 A | 5/2016 |
| JP | 2016103411 A | 6/2016 |
| JP | 2018156941 A | 10/2018 |
| WO | 2007004590 A1 | 1/2007 |
| WO | 2012105048 A1 | 8/2012 |
| WO | 2012157119 A1 | 11/2012 |
| WO | 2013/046443 A1 | 4/2013 |
| WO | 2013073038 A1 | 5/2013 |
| WO | 2014013837 A1 | 1/2014 |

* cited by examiner

COMPOSITE CATHODE ACTIVE MATERIAL, PREPARATION METHOD THEREOF, CATHODE LAYER INCLUDING THE SAME, AND ALL-SOLID SECONDARY BATTERY INCLUDING THE CATHODE LAYER

CROSS-REFERENCE TO RELATED APPLICATIONS

This application claims priority to and the benefit of Japanese Patent Application No. 2020-027205, filed on Feb. 20, 2020 in the Japanese Patent Office, and Korean Patent Application No. 10-2020-0052880, filed on Apr. 29, 2020, in the Korean Intellectual Property Office, and all the benefits accruing therefrom under 35 U.S.C. § 119, the contents of which are incorporated herein in its entirety by reference.

BACKGROUND

1. Field

The present disclosure relates to a composite cathode active material, a method of preparing the same, a cathode layer including the same, and an all-solid secondary battery including the cathode layer.

2. Description of Related Art

In an all-solid secondary battery, when a reaction occurs at an interface between a cathode active material particle and a solid electrolyte during charge, a resistive component is generated. In order to suppress the generation of the resistive component, a method of reducing the interfacial resistance by coating the surface of the cathode active material particle with another material has been proposed.

However, in such a method there are problems in that the improvement of battery characteristics is insufficient, and such methods may be complex or difficult. Thus there is a need for improved materials and an improved method of suppressing increased resistance.

SUMMARY

Provided is a composite cathode active material capable of improving battery characteristics such as load characteristics and cycle characteristics of all-solid secondary batteries.

Provided is a method of preparing the composite cathode active material.

Provided is a cathode layer including the composite cathode active material.

Provided is an all-solid secondary battery including the cathode layer including the composite cathode active material.

Additional aspects will be set forth in part in the description which follows and, in part, will be apparent from the description.

According to an aspect, a composite cathode active material includes:
a cathode active material particle; and
a coating layer coating on a surface of the cathode active material particle, wherein the coating layer includes an acetate or acetate salt.

According to an aspect, a cathode layer includes the composite cathode active material and a solid electrolyte on a surface of the composite cathode active material.

According to an aspect, an all-sold secondary battery includes:
a cathode layer including the composite cathode active material;
an anode layer; and
a solid electrolyte layer between the cathode layer and the anode layer.

According to an aspect, a method of preparing a composite cathode active material includes:
providing a cathode active material particle;
disposing lithium acetate and a C9 to C20 trialkyl borate on a surface of a cathode active material particle to provide a coated cathode active material particle; and
heat-treating the coated cathode active material particle at a temperature of about 200° C. to about 400° C. to prepare the composite cathode active material.

According to an aspect, a composite cathode active material includes:
a cathode active material particle; and
a coating layer on a surface of the cathode active material particle, wherein the coating layer includes Li, B, and an acetate, and wherein a total content of the coating layer is between about 0.01 mole percent to about 2 mole percent, based on 100 mole percent of the cathode active material particle.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
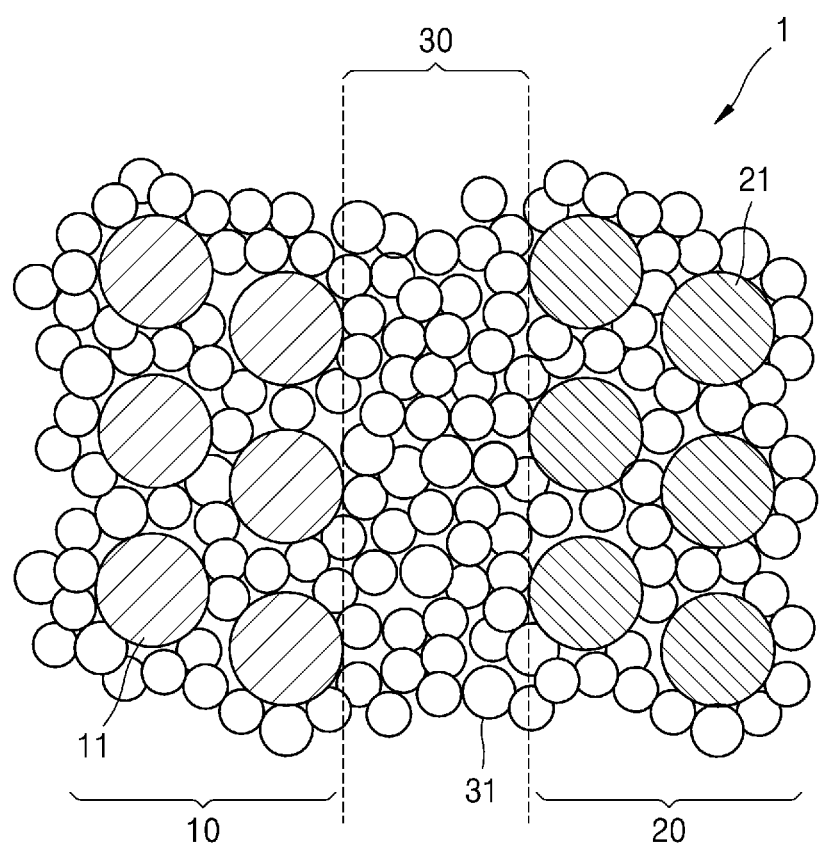
FIG. 1 is a schematic view illustrating an embodiment of a structure of an all-solid secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, "argyrodite-type" or "argyrodite structure" means that the compound has a structure that is isostructural with argyrodite, $Ag_8GeS_6$.

A "rock salt type structure" means that the compound has a structure that is isostructural with $NaFeO_2$.

A C rate is a discharge rate of a cell, and is obtained by dividing a total discharge capacity of the cell by a total discharge period of time of 1 hour, e.g., a C rate for a battery having a discharge capacity of 1.6 ampere-hours would be 1.6 amperes.

Hereinafter, a composite cathode active material according to an embodiment, a preparation method thereof, a cathode layer including the composite cathode active material, and an all-solid secondary battery including the cathode layer will be described in detail with reference to the attached drawings.

According to an aspect, there is provided a composite cathode active material, including: a cathode active material particle; and a coating layer on a surface of the cathode active material particle, wherein the coating layer includes an acetate or acetate salt.

In an all-solid secondary battery, a method of reducing interfacial resistance by manufacturing a coated cathode active material by forming a coating layer on the surface of a cathode active material particle has been attempted. However, when the coated cathode active material is used, the characteristics of an all-solid secondary battery are not satisfactory.

Thus, in order to solve these problems, the present inventors provide a composite cathode active material having a coating layer containing an acetate on the surface of the cathode active material.

According to an embodiment, a composite cathode active material includes a coating layer on the surface of a cathode active material particle that includes an acetate, which improves battery characteristics such as load characteristics and cycle characteristics of all-solid secondary batteries, as compared with all-solid secondary batteries of the prior art. In particular, when a charge voltage of 4 V or more is used, an increase in interfacial resistance may be reduced, and cycle characteristics may be improved, as compared with a cathode active material having other coating layers.

In addition, when the coating layer on a surface of the cathode active material particle includes only an acetate, even when a special manufacturing apparatus is not provided, a composite cathode active material and an all-solid secondary battery may be more economically manufactured using a suitable apparatus.

According to an embodiment, the content of an acetate in the coating layer is about 70 mole percent (mol %) to about 95 mol %, about 75 mole percent (mol %) to about 90 mol %, or about 80 mole percent (mol %) to about 85 mol %, based on the total content of the coating layer. In an aspect, the content of the acetate may be measured by thermogravimetric analysis. Thermogravimetric analysis (TGA) is an analytical technique used to determine a material's thermal stability and its fraction of volatile components can be determined by monitoring the weight change that occurs as a sample is heated. Heating at a constant rate is mentioned.

In thermogravimetric analysis of a sample, a weight loss occurs between about 300° C. to about 500° C., for example about 350° C. to about 500° C., and while not wanting to be bound by theory, the weight loss due to the acetate is understood to occurs at about 400° C. The content of the acetate can be determined from the weight loss.

Figure 8:
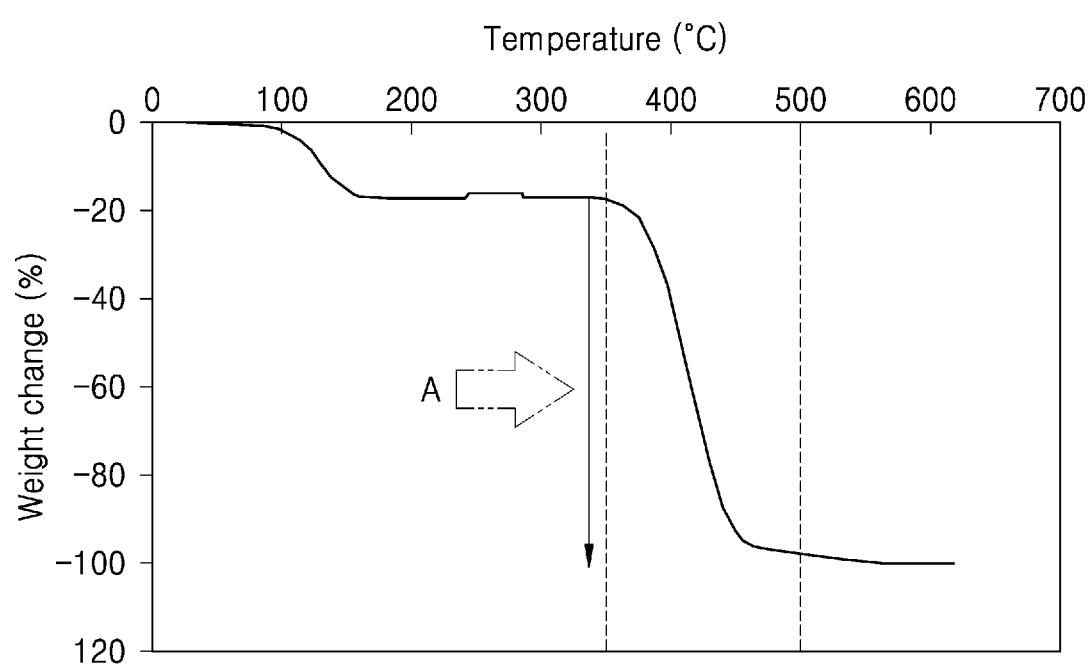
FIG. 8 is a graph of weight change (%) versus temperature (° C.) of thermogravimetric analysis of a composite cathode active material according to an embodiment.

According to an embodiment, the weight loss indicated by A in the thermogravimetric analysis graph of FIG. 8 corresponds to the content of the acetate. A indicates weight loss occurring at 350° C. to 500° C.

When the coating layer includes zirconium oxide and/or boron oxide and the total content of zirconium oxide and boron oxide in the coating layer is about 2.5 mol % to about 25 mol %, about 5 mol % to about 20 mol %, or about 10 mol % to about 15 mol %, based on the total content of the coating layer, battery characteristics, such as load or rate characteristics and cycle characteristics of an all-solid secondary battery having a cathode layer including the composite cathode active material may be improved relative to when the coating layer is omitted.

The total content of zirconium oxide and/or boron oxide and lithium oxide in the coating layer is about 5 mol % to about 30 mol %, about 7 mol % to about 25 mol %, or about 9 mol % to about 20 mol %, based on the total content of the coating layer.

As described above, the composite cathode active material includes a coating layer containing a composite including an acetate and zirconium oxide and/or lithium oxide.

The cathode active material particle has an average secondary particle diameter of about 20 µm or less, about 10 µm or less, for example, from about 0.01 µm to about 20 µm, about 0.02 to about 15 µm, about 0.05 µm to about 10 µm, about 0.07 µm to about 7 µm, or about 0.1 µm to about 5 µm.

The cathode active material particle is a material capable of absorbing and desorbing lithium. The cathode active material particle may comprise a lithium transition metal oxide having a layered rock salt type structure, and the lithium transition metal oxide may be $LiNi_xCo_yAl_zO_2$ ($0<x<1$, $0<y<1$, $0<z<1$, $x+y+z=1$) or $LiNi_xCo_yMn_zO_2$ ($0<x<1$, $0<y<1$, $0<z<1$, $x+y+z=1$).

According to an aspect, there is provided a cathode layer including the composite cathode active material.

According to an aspect, there is provided an all-sold secondary battery, comprising: a cathode layer comprising the composite cathode active material; an anode layer; and a solid electrolyte layer between the cathode layer and the anode layer.

When the cathode layer includes a solid electrolyte and the solid electrolyte is a solid electrolyte containing sulfur, the cathode layer exhibits improved performance.

The solid electrolyte in the cathode layer may be the same as or different from the solid electrolyte in the solid electrolyte layer.

In the all-solid secondary battery according to an embodiment, the solid electrolyte used in the cathode layer has a different particle diameter range from the solid electrolyte used in the solid electrolyte layer. The solid electrolyte used in the cathode layer has a smaller average particle diameter than, for example, the solid electrolyte used in the solid electrolyte layer.

The average particle diameter of the solid electrolyte used in the cathode layer is about 100 nm to about 10 µm, about 300 nm to about 8 µm, or about 500 nm to about 5 µm, and the average particle diameter of the solid electrolyte used in the solid electrolyte layer is about 500 nm to about 20 µm, about 700 nm to about 15 µm, or about 900 nm to about 10 µm.

Configuration of all-Solid Secondary Battery

Figure 2:
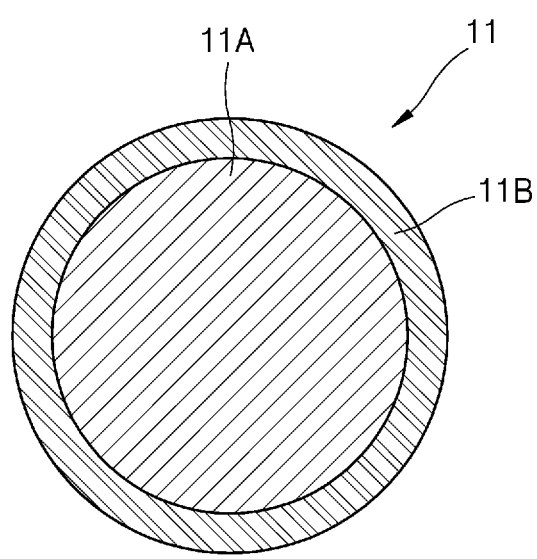
FIG. 2 is a schematic view illustrating an embodiment of a structure of a composite cathode active material.

FIG. 1 is a schematic cross-sectional view illustrating an embodiment of a layer structure of an all-solid secondary battery 1. FIG. 2 is a schematic cross-sectional view illustrating an embodiment of a structure of a composite cathode active material 11. The all-solid secondary battery may be, for example, an all-solid lithium ion secondary battery.

As shown in FIG. 1, the all-solid secondary battery 1 has a structure in which a solid electrolyte layer 30 is between a cathode layer 10 and an anode layer 20. In an aspect, the solid electrolyte layer 30 is between the cathode layer 10 and the anode layer 20, and the layers are laminated together.

Cathode Layer

The cathode layer 10 includes a composite cathode active material 11 and a solid electrolyte 31 on a surface of the composite cathode active material 11. The cathode layer 10 may further include a conductive material to supplement electronic conductivity. The solid electrolyte 31 will be further described later together with the solid electrolyte layer 30.

As shown in FIG. 2, the composite cathode active material 11 includes a cathode active material particle 11A and a coating layer 11B on the surface of the cathode active material particle 11A. As the cathode active material particle 11A, not the primary particle shown in FIG. 2 is mentioned. Also, a secondary particle formed by aggregating the plurality of primary particles may be used, and the coating layer 11B may be disposed on the surface of the primary particle, the secondary particle, or both.

The cathode active material particle 11A may be used without limitation as long as it includes a material capable of reversibly absorbing and desorbing lithium ions. The cathode active material particle 11A may be formed using a lithium-containing metal compound such as lithium cobalt oxide (hereinafter referred to as LCO), lithium nickel oxide, lithium nickel cobalt oxide, lithium nickel cobalt aluminum oxide (hereinafter referred to as NCA), lithium nickel cobalt manganese oxide (hereinafter referred to as NCM), lithium manganate, or lithium iron phosphate, or metal compound such as nickel sulfide, copper sulfide, lithium sulfide, sulfur, iron oxide, or vanadium oxide.

The materials of the cathode active material particle 11A may be used alone or in combination of two or more. As the cathode active material particle 11A, not only the primary particle shown in FIG. 2, but also a secondary particle formed by aggregating the plurality of primary particles may be used. That is, the secondary particle may be an aggregate of two or more primary particles.

Further, the cathode active material particle 11A may comprise a lithium transition metal oxide having a layered rock salt type structure. Here, the "layered rock salt type structure" refers to a structure in which oxygen atom layers and metal atom layers are alternately and regularly arranged in the <111> direction of a cubic rock salt type structure and thus each of the atom layers forms a two-dimensional plane. Further, the "cubic rock salt type structure" refers to a sodium chloride (NaCl) type structure, which is a kind of crystal structure, and more specifically, in which a face centered cubic (FCC) lattice, formed of cations and anions, respectively, are misaligned with each other by one-half of the ridge of the unit lattice.

As the lithium transition metal oxide having a layered rock salt type structure, an example may be a compound represented by Formula 1.

$$Li_a(Ni_xCo_yMn_zM_k)O_2 \quad \text{Formula 1}$$

wherein, in Formula 1,

M is at least one of boron (B), magnesium (Mg), calcium (Ca), strontium (Sr), barium (Ba), titanium (Ti), vanadium (V), chromium (Cr), iron (Fe), copper (Cu), zirconium (Zr), or aluminum (Al), and $0.95 \leq a \leq 1.3$, $0<x<1$, $0<y<1$, $0 \leq z<1$, $0 \leq k<1$, and $x+y+z+k=1$.

In Formula 1, $0.3 \leq x<1$.

In Formula 1, the sum of mole fractions of Ni, Co, Mn and M may be 1.

In Formula 1, the content of nickel is, for example, about 30 mol % to about 95 mol %, about 50 mol % to about 95 mol %, about 50 mol % to about 90 mol %, or about 55 mol % to about 85 mol %, based on a total content of Ni, Co, Mn and M in the compound of Formula 1.

In Formula 1, $0.5 \leq x \leq 0.95$, $0<y \leq 0.5$, $0 \leq z \leq 0.5$, and $0 \leq k \leq 0.05$. In Formula 1, a is 1 to 1.1, y is 0.1 to 0.3, and z is 0.05 to 0.3. According to an embodiment, in Formula 1, k is 0. According to an embodiment, in Formula 1, when $0<k \leq 0.05$, M may be aluminum (Al).

The compound of Formula 1 is, for example, $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, or $LiNi_{0.85}Co_{0.1}Al_{0.05}O_2$. A combination comprising at least one of the foregoing may be used.

According to an embodiment, the lithium transition metal oxide having a layered rock salt type structure may be, for example, a ternary lithium transition metal oxide such as $Li_aNi_xCo_yAl_zO_2$ $0<x<1$, $0<y<1$, $0<z<1$, $x+y+z=1$) or $Li_aNi_xCo_yMn_zO_2$ $0<x<1$, $0<y<1$, $0<z<1$, $x+y+z=1$).

According to an embodiment, the lithium transition metal oxide having a layered rock salt type structure may be, for example, a ternary lithium transition metal oxide such as $LiNi_xCo_yAl_zO_2$ wherein $0<x<1$, $0<y<1$, $0<z<1$, and $x+y+z=1$, or $LiNi_xCo_yMn_zO_2$, wherein $0<x<1$, $0<y<1$, $0<z<1$, and $x+y+z=1$.

The cathode active material particle 11A has a shape such as a true sphere or an elliptical shape. The particle diameter of the cathode active material particle 11A is not particularly limited, and may be in a suitable range for an all-solid secondary battery. Further, the content of the cathode active material particle 11A in the cathode layer 10 is also not particularly limited, and may be in a range suitable for the cathode layer 10 of the all-solid secondary battery.

According to an embodiment, the cathode active material particles 11A have an average secondary particle diameter of 20 μm or less or 10 μm or less. According to an embodiment, the cathode active material particles 11A have an average secondary particle diameter of about 1 μm to 20 μm or about 1 μm to about 10 μm. In the present specification, the term "average secondary particle diameter" refers to an average particle diameter of cathode active material secondary particles.

When the average secondary particle diameter of the cathode active material particles 11A is controlled to about 1 μm to about 20 μm, the cathode active material 11 is not aggregated and is easily dispersed into the cathode layer 10, so that a reaction at the interface between the cathode active material 11 and the solid electrolyte 31 or between the cathode active material 11 and the conductive material may be facilitated. Further, when the average secondary particle diameter is controlled to about 10 μm or less, the surface area of the cathode active material 11 increases, so that the reaction at the interface between the cathode active material 11 and the solid electrolyte 31 or between the cathode active material 11 and the conductive material may be further facilitated.

The coating layer 11B includes, for example, lithium oxide ($Li_2O$), boron oxide ($B_2O_3$), and an acetate or a derivative thereof. The derivative of the acetate may be a product of heating the acetate at about 200° C. to about 500° C., about 250° C. to about 450° C. The heating may comprise heating in the presence of an oxide such as zinc oxide or boron oxide, for example. The acetate may be an alkali metal acetate, alkaline earth metal acetate, a transition metal acetate, a combination thereof, or a derivative thereof. The alkali metal acetate may be lithium acetate, sodium acetate, or potassium acetate. The alkaline earth metal acetate may be magnesium acetate, calcium acetate, or strontium acetate. The transition metal acetate may be an acetate of a Group 3 to Group 12 element. Zinc acetate is mentioned. A combination comprising at least one of the foregoing may be used.

The acetate or the acetate salt may be lithium acetate or a reaction product between the lithium acetate and trialkylborate.

In an aspect, the acetate is derived from, for example, lithium acetate added as a starting material for the coating layer 11B.

The content of the acetate in the coating layer 11B is in a range of about 70 mol % to about 95 mol %, based on the total content of the coating layer 11B. The coating layer 11B may also comprise lithium oxide ($Li_2O$), boron oxide ($B_2O_3$), or zirconium oxide (ZrO), in addition to the acetate. The total content of the components other than the acetate may be about 5 mol % to about 30 mol %, about 10 mol % to about 25 mol %, or about 15 mol % to about 20 mol %, based on the total content of the coating layer 11B.

According to an embodiment, the total content of zirconium oxide and/or boron oxide and lithium oxide is about 5 mol % to about 30 mol %, about 10 mol % to about 25 mol %, or about 15 mol % to about 20 mol %, based on the total content of the coating layer 11B.

In the ratio of lithium oxide ($Li_2O$) and boron oxide ($B_2O_3$) contained in the coating layer 11B, the content of boron oxide ($B_2O_3$) may be greater than or equal to that of lithium oxide ($Li_2O$). That is, the content of boron oxide ($B_2O_3$) in the coating layer 11B is about 50 mol % or more, about 60 mol % or more, or about 62.5 mol % or more, of the total content of lithium oxide ($Li_2O$) and boron oxide ($B_2O_3$). Specific examples of satisfying the mixing ratio of lithium oxide and boron oxide in the coating layer 11B include $Li_3B_{11}O_{18}$ and the like.

When the coating layer 11B contains boron oxide and/or zirconium oxide, the total content of boron oxide and/or zirconium oxide is about 2.5 mol % to about 25 mol %, about 5 mol % to about 20 mol %, or about 10 mol % to about 15 mol %, based a total content of the coating layer. When the total content of boron oxide and/or zirconium oxide is too low, the content ratio of lithium oxide in the coating layer 11B becomes high, and lithium oxide crystals are easily precipitated in the coating layer 11B. When the crystals are precipitated in this way, the lithium ion conductivity in the coating layer 11B may be lowered. In contrast, when the total content of boron oxide and zirconium oxide is too high, the content ratio of lithium oxide in the coating layer 11B may decrease, and the lithium ion conductivity in the coating layer 11B may be lowered.

When the total content of boron oxide and/or zirconium oxide is within the above range, thereby obtaining a cathode active material having improved lithium ion conductivity in the coating layer 11B.

The content of the coating layer 11B with respect to the cathode active material particle 11A is about 0.01 mol % to about 2 mol %, 0.05 mol % to about 1 mol %, or 0.1 mol % to about 0.5 mol %, based on 100 mol % of the non-coated cathode active material particle 11A. If the content of the cathode active material particle is 1 mol, the content of the coating layer may be 2 mol %. For example, 1 mole of the cathode active material particle is when the content of the cathode active material particle is 100 g (a total molecular weight of the cathode active material particle is 100 g/mol).

The coating layer 11B has a thickness of about 0.5 nm to about 500 nm, or about 0.5 nm to about 100 nm. When the thickness of the coating layer 11B is within these ranges, the efficiency of an interfacial reaction between the cathode active material 11 and the solid electrolyte 31 may be improved, thereby improving the cycle characteristics of an all-solid secondary battery. Further, when the thickness of the coating layer 11B is within these ranges, resistance due to the coating layer 11B may be low. The thickness of the coating layer 11B may be measured using a cross-sectional image or the like by a transmission electron microscope (TEM).

The coating layer 11B may be a single layer or a plurality of layers of two or more layers. When the coating layer 11B includes a plurality of layers of two or more layers, the compositions of the respective layers may be the same as or different from each other. For example, the surface of the cathode active material particle 11A may be coated with a first coating layer including an acetate, lithium oxide, and zirconium oxide, and the surface of the first coating layer may be coated with a second coating layer including an acetate, lithium oxide, and boron oxide. In this case, the total content of zirconium oxide and boron oxide in the coating layer 11B refers to the sum of the content of zirconium oxide in the first coating layer and the content of boron oxide in the second coating layer.

According to an embodiment, each of the cathode active material particles 11A is coated with the coating layer 11B, but may have a structure in which the outer surface of the cathode active material formed into a plate shape is covered with the coating layer 11B.

The cathode active material according to an embodiment may include a first coating layer including zirconium oxide and a second coating layer disposed on the first coating layer and including boron oxide, lithium oxide, and the acetate.

The cathode active material according to an embodiment may include a first coating layer including an acetate, lithium oxide, and zirconium oxide and a second coating layer including an acetate, lithium oxide, and boron oxide.

In the second coating layer, boron oxide, lithium oxide, and the acetate may have an organic composite form.

The cathode layer 10 may include a conductive material, a binder, a filler, a dispersant, and an ionic conductive material in addition to the aforementioned components. Examples of the conductive material capable of being blended in the cathode layer 10 may include graphite, carbon black, acetylene black, Ketjen black, carbon fiber, and metal powder. Examples of the binder that may be blended in the cathode layer 10 may include styrene butadiene rubber (SBR), polytetrafluoroethylene, polyvinylidene fluoride, and polyethylene. Suitable materials may be used as the filler, the dispersant, the binder, and the ion conductive material for an electrode of the all-solid secondary battery.

Anode Layer

As shown in FIG. 1, the anode layer 20 includes an anode active material 21 and a solid electrolyte 31. The solid electrolyte 31 will be described later together with the solid electrolyte layer 30.

The anode active material 21 has a low charge-discharge potential as compared with the cathode active material included in the cathode active material particle 11A, and may be alloyed with lithium or be capable of reversibly absorbing and desorbing lithium.

For example, the anode active material 21 may be at least one of a carbon-based anode active material, a metal anode active material, or a metalloid anode active material.

Examples of the metal anode active material or the metalloid anode active material may include metals such as lithium (Li), indium (In), aluminum (Al), tin (Sn), silicon (Si), gold (Au), platinum (Pt), palladium (Pd), silver (Ag), bismuth (Bi), zinc (Zn), or an alloys thereof. Any suitable metal anode active material or any suitable metalloid anode active material may be used as long as it forms an alloy or a compound with lithium. For example, nickel (Ni) is not a metal anode active material because it does not form an alloy with lithium.

Examples of the carbon-based anode active material may include artificial graphite, graphite carbon fiber, resin-fired carbon, pyrolysis vapor-grown carbon, coke, mesocarbon microbeads (MCMB), furfuryl alcohol resin-fired carbon, polyacene, pitch-based carbon fiber, vapor-grown carbon fiber, natural graphite, or a non-graphitic carbon. The anode active material 21 may be used alone, or may also be used in a combination of two or more anode active materials. The anode active material 21 may include polyacene.

The anode active material 21 may include a mixture of amorphous carbon, and at least one of gold (Au), platinum (Pt), palladium (Pd), silicon (Si), silver (Ag), aluminum (Al), bismuth (Bi), tin (Sn), or zinc (Zn). The weight ratio of the mixture of amorphous carbon to gold (Au), or the like is, for example, about 10:1 to about 1:2, about 5:1 to about 1:1, or about 4:1 to about 2:1, but is not limited thereto. The weight ratio thereof is selected depending on desired characteristics of an all-solid secondary battery. When the anode active material has such a composition, cycle characteristics of an all-solid secondary battery are improved.

The anode active material includes a mixture of a first particle comprising amorphous carbon and a second particle comprising a metal or a metalloid. Examples of the metal or the metalloid include gold (Au), platinum (Pt), palladium (Pd), silicon (Si), silver (Ag), aluminum (Al), bismuth (Bi), tin (Sn), or zinc (Zn). The metalloid is otherwise a semi-conductor. The content of the second particle is about 8 wt % to about 60 wt %, about 10 wt % to about 50 wt %, about 15 wt % to about 40 wt %, or about 20 wt % to about 30 wt %, based on the total weight of the mixture. When the content of the second particle is within the above range, for example, cycle characteristics of the all-solid secondary battery 1 may be improved.

Further, in the anode layer 20, in addition to the anode active material and solid electrolyte 31, for example, additives such as a conductive material, a binder, a filler, a dispersant, or an ion conductive material may be appropriately included.

The same additives as the additives to be blended in the cathode layer 10 may be used as those to be blended in the anode layer 20.

Solid Electrolyte Layer

The solid electrolyte layer may be formed between the cathode layer 10 and the anode layer 20, and may comprise a solid electrolyte 31.

The solid electrolyte 31 is powdered, and is composed of a solid electrolyte material containing sulfur.

Examples of the solid electrolyte material may include $Li_2S$—$P_2S_5$, $Li_2S$—$P_2S_5$—LiX (X is a halogen atom, for example, at least one of I, Br, or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n are each a positive number, and Z is at least one of Ge, Zn, or Ga), $Li_2S$—$GeS_2$, $Li_2S$—$SiS_2$—$Li_3PO_4$, and $Li_2S$—$SiS_2$-$Li_pMO_q$ (p and q are each a positive number, and M is at least one of P, Si, Ge, B, Al, Ga, or In). Here, the solid electrolyte material is prepared by treating a start material (for example, $Li_2SP_2S_5$) by a melt quenching method or a mechanical milling method. After the treatment, the solid electrolyte material may be heat-treated. The solid electrolyte 31 may be amorphous, crystalline, or a mixed state thereof.

The solid electrolyte 31 may include a solid electrolyte material including sulfur (S), phosphorus (P), and lithium (Li). For example, the solid electrolyte material may include $Li_2S$—$P_2S_5$.

Here, when the solid electrolyte material including $Li_2S$—$P_2S_5$ is used to form the solid electrolyte 31, the mixing molar ratio of $Li_2S$ and $P_2S_5$ may be selected, for example, in the range of $Li_2S:P_2S_5$ of about 50:50 to about 90:10. The solid electrolyte layer 30 may include a binder. Examples of the binder in the solid electrolyte layer 30 may include styrene-butadiene rubber (SBR), polytetrafluoroethylene, polyvinylidene fluoride, and polyethylene.

The solid electrolyte according to an embodiment may include at least one of $Li_2S$—$P_2S_5$, $Li_2S$—$P_2S_5$—LiX (X is a halogen atom), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n are each a positive number, and Z is one of Ge, Zn, and Ga), $Li_2S$—$GeS_2$, $Li_2S$—$SiS_2$—$Li_3PO_4$, $Li_2S$—$SiS_2$-$Li_pMO_q$ (p and q are each a positive number, and M is one of P, Si, Ge, B, Al, Ga, and In), $Li_{7-x}PS_{6-x}Cl(0≤x≤2)$, $Li_{7-x}PS_{6-x}Br_x$ $(0≤x≤2)$, or $Li_{7-x}PS_{6-x}I_x$ $(0≤x≤2)$.

The solid electrolyte layer 30 may include an argyrodite-type solid electrolyte.

The argyrodite-type solid electrolyte may include at least one of $Li_{7-x}PS_{6-x}Cl_x$ $(0≤x≤2)$, $Li_{7-x}PS_{6-x}Br_x$ $(0≤x≤2)$, or $Li_{7-x}PS_{6-x}I_x$ $(0≤x≤2)$.

There is exemplified a case where the solid electrolyte 31 includes sulfur, but the solid electrolyte 31 used in the all-solid secondary battery 1 is not limited to containing sulfur, and may be used as long as it is suitable for the all-solid secondary battery 1.

The solid electrolyte may be, for example, an oxide-based solid electrolyte.

For example, the oxide-based solid electrolyte includes at least one of $Li_{1+x+y}Al_xTi_{2-x}Si_yP_{3-y}O_{12}$ $(0<x<2$ and $0≤y<3)$, $BaTiO_3$, $Pb(Zr_aTi_{1-a})O_3$ $(0≤a≤1)$ (PZT), $Pb_{1-x}La_xZr_{1-y}Ti_yO_3$ (PLZT) $(0≤x<1$ and $0y<1)$, $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, $BaO$, ZnO, $ZrO_2$, $Y_2O_3$, $Al_2O_3$, $TiO_2$, $SiO_2$, $Li_3PO_4$, $Li_xTi_y(PO_4)_3$ $(0<x<2, 0<y<3)$, $Li_xAl_yTi_z(PO_4)_3$ $(0<x<2, 0<y<1,$ and $0<z<3)$, $Li_{1+x+y}(Al_aGa_{1-a})_x(Ti_bGe_{1-b})_{2-x}Si_yP_{3-y}O_{12}$ $(0≤x≤1, 0≤y≤1, 0≤a≤1,$ and $0≤b≤1)$, $Li_xLa_yTiO_3$ $(0<x<2$ and $0<y<3)$, $Li_2O$, LiOH, $Li_2CO_3$, $LiAlO_2$, $Li_2O$—$Al_2O_3$—$SiO_2$—$P_2O_5$—$TiO_2$—$GeO_2$, and $Li_{3+x}La_3M_2O_{12}$ (M is at least one of Te, Nb, or Zr and x is an integer of 1 to 10). The solid electrolyte is prepared by a sintering method or the like. For example, the oxide-based solid electrolyte may be a garnet-type solid electrolyte that is at least one of $Li_7La_3Zr_2O_{12}$ (LLZO) or $Li_{3+x}La_3Zr_{2-a}M_aO_{12}$ (e.g., M doped LLZO, wherein M is at least one of Ga, W, Nb, Ta, or Al, x is an integer of 1 to 10).

Current Collector

The all-solid secondary battery 1 may further include a cathode current collector supplying a current to the cathode layer 10. The cathode current collector is disposed outside the cathode layer 10. As the cathode current collector, a plate-like body or foil-like body including indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof may be used.

The all-solid secondary battery 1 may include an anode current collector supplying a current to the anode layer 20. The anode current collector is disposed outside the anode layer 20. The anode current collector may include a material not reacting with lithium, that is, a material not forming both an alloy and a compound. Examples of the material of the anode current collector may include copper (Cu), stainless steel, titanium (Ti), iron (Fe), cobalt (Co), or nickel (Ni). The anode current collector may be made of any one of these metals, or may be made of a metal alloy of two or more thereof or a cladding material.

Figure 5:
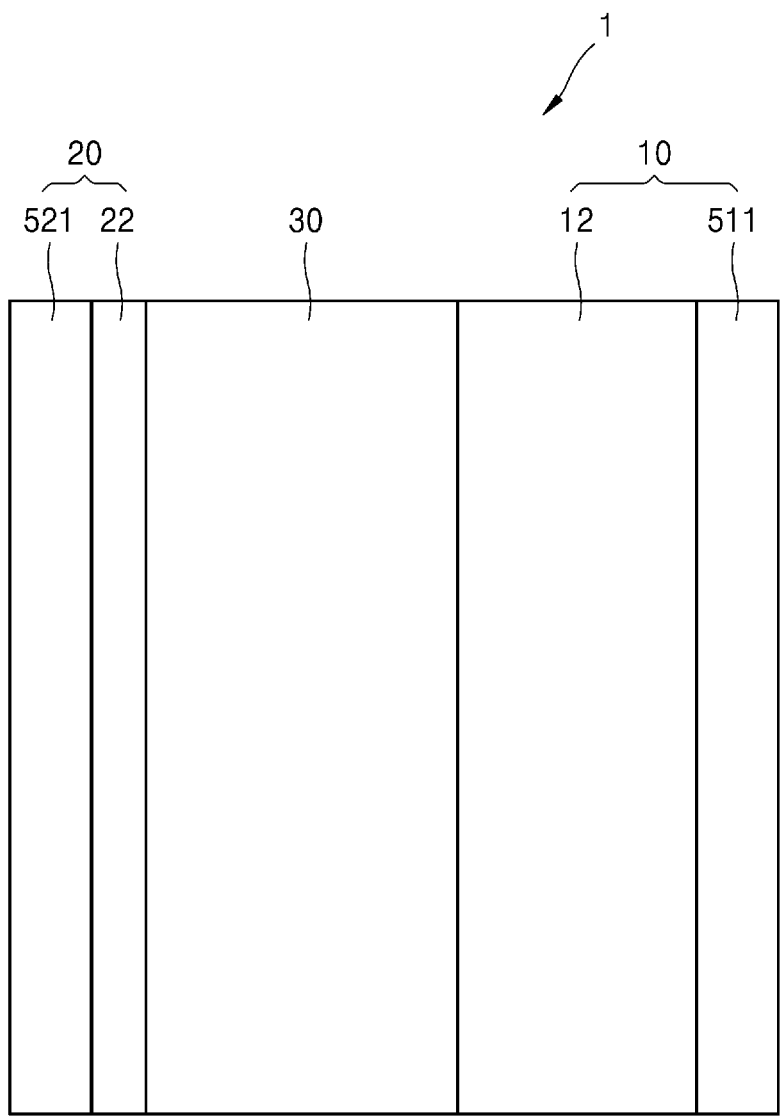
FIGS. 5 to 7 are cross-sectional views of an embodiment of an all-solid secondary battery.

Referring to FIG. 5, the all-solid secondary battery 1 includes an anode layer 20 including an anode current collector 521 and a first anode active material layer 22, a cathode layer 10 including a cathode current collector 511 and a cathode active material layer 12, and a solid electrolyte layer 30 between the anode layer 20 and the cathode layer 10. The cathode layer 10 may include a sulfide-based solid electrolyte. For example, the cathode layer 10 may include a cathode active material, a sulfide-based solid electrolyte, and a conducting agent.

Figure 6:
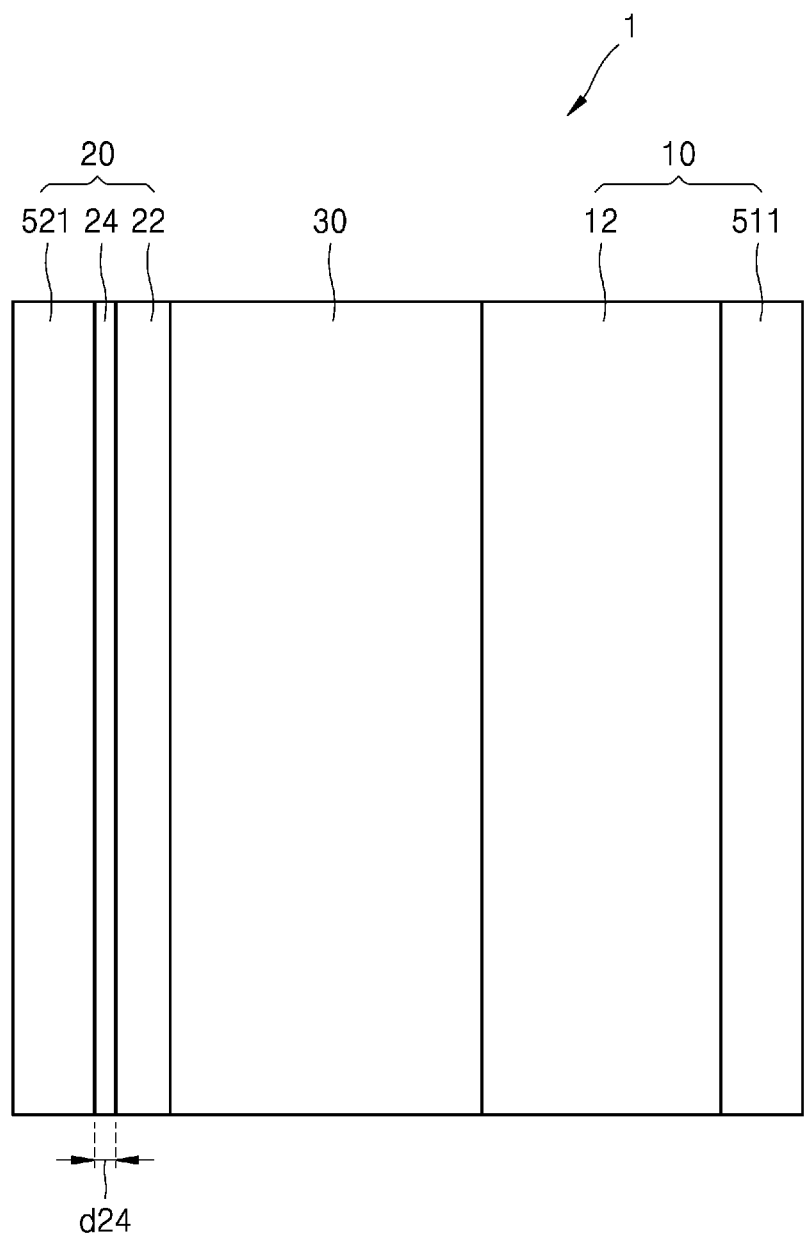

As shown in FIG. 6, the all-solid secondary battery 1 includes a thin film 24 disposed on the anode current collector 521 and including an element capable of forming an alloy with lithium. The thin film 24 is disposed between the anode current collector 521 and the first anode active material layer 22. The thin film 24 includes an element capable of forming an alloy with lithium. Examples of the element capable of forming an alloy with lithium include, but are not limited to, gold, silver, zinc, tin, indium, silicon, aluminum, and bismuth. Any suitable element may be used as long as it is an element capable of forming an alloy with lithium. The thin film 24 is made of one of these metals, or is made an alloy of several types of metals. When the thin film 24 is disposed on the anode current collector 521, for example, the precipitation form of a second anode active material layer (not shown) deposited between the thin film 24 and the first anode active material layer 22 may be further flattened, and cycle characteristics of the all-solid secondary battery 1 may be improved.

The thickness d24 of the thin film 24 is, for example, about 1 nm to about 800 nm, about 10 nm to about 700 nm, about 50 nm to about 600 nm, or about 100 nm to about 500 nm. When the thickness d24 of the thin film 24 is less than about 1 nm, the thin film 24 may not provide improved cycle characteristics of the all-solid secondary battery 1. When the thickness of the thin film 24 is too thick, the thin film 24 itself may absorb lithium to decrease the amount of lithium deposited in the anode layer to reduce the energy density of the all-solid secondary battery 1, and cycle characteristics of the all-solid secondary battery 1 may be deteriorated. The thin film 24 may be disposed on the anode current collector 521 by, for example, a vacuum deposition method, a sputtering method, a plating method, or the like, but the present disclosure is not necessarily limited thereto. Any suitable method may be used as long as it may form the thin film 24.

Figure 7:
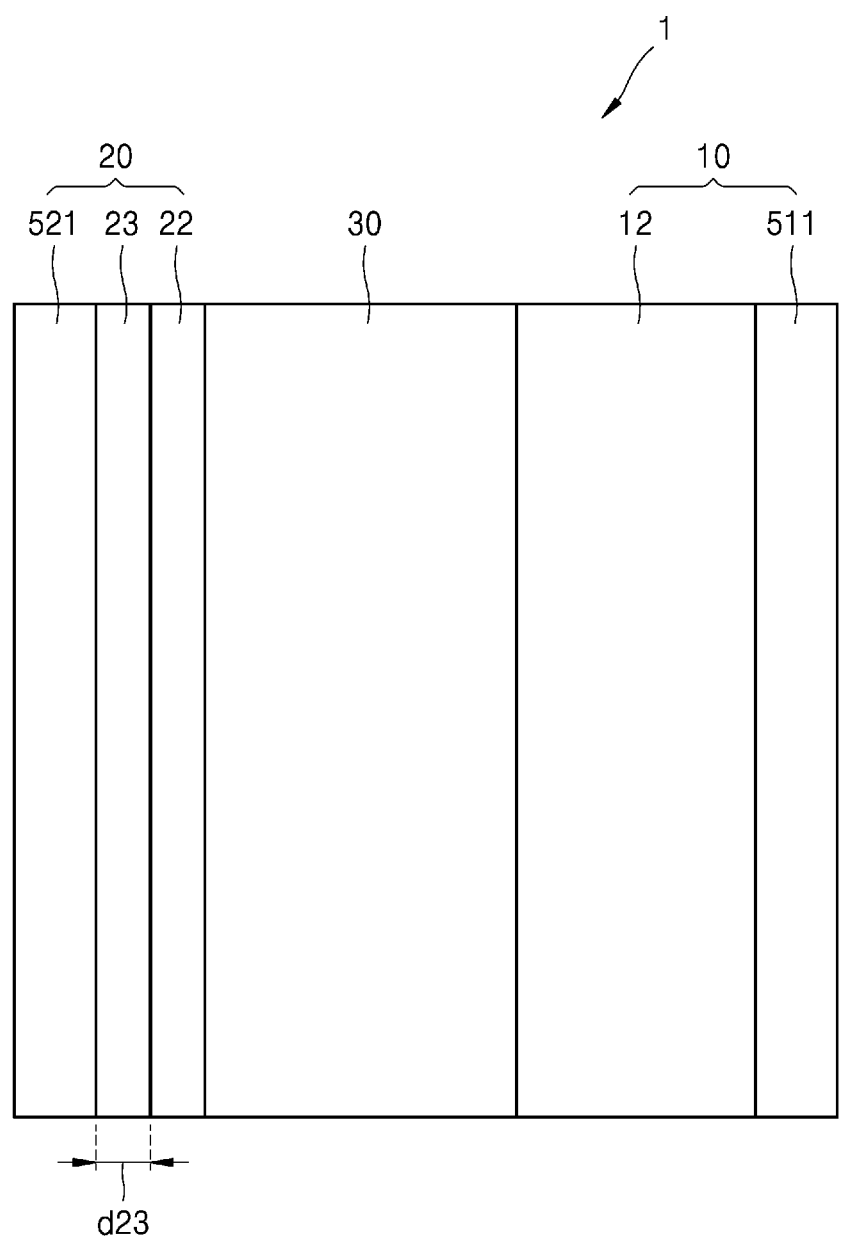

Referring to FIG. 7, the all-solid secondary battery 1 further includes a second anode active material layer 23 disposed between the anode current collector 521 and the solid electrolyte layer 30 by charging. The all-solid secondary battery 1 further comprises a second anode active material layer 23 disposed between the anode current collector 521 and the first anode active material layer 22 by charging. Although not shown in the drawing, the all-solid secondary battery 1 further includes a second anode active material layer 23 disposed between the solid electrolyte layer 30 and the first anode active material layer 22 by charging. Although not shown in the drawing, the all-solid secondary battery 1 further includes a second anode active material layer 23 disposed in the first anode active material layer 22 by charging.

The second anode active material layer 23 is a metal layer including lithium or a lithium alloy. The metal layer includes lithium or lithium alloy. Accordingly, since the second anode active material layer 23 is a metal layer containing lithium, it acts as, for example, a lithium reservoir. Examples of the lithium alloy may include, but are not limited to, Li—Al alloy, Li—Sn alloy, Li—In alloy, Li—Ag alloy, Li—Au alloy, Li—Zn alloy, Li—Ge alloy, and Li—Si alloy. Any suitable lithium alloy may be used. The second anode active material layer 23 may be made of one of these alloys or lithium, or made of various types of alloys.

The thickness d23 of the second anode active material layer is not particularly limited, but may be, for example, about 1 μm to about 1000 μm, about 2 μm to about 500 μm, about 3 μm to about 200 μm, about 4 μm to about 150 μm, about 5 μm to about 100 μm, or about 6 μm to about 50 μm. When the thickness d23 of the second anode active material layer is too thin, the second anode active material layer 23 may not serve as a lithium reservoir. When the thickness d23 of the second anode active material layer is too thick, the mass and volume of the all-solid secondary battery 1 increase, and there is a possibility that cycle characteristics deteriorate. The second anode active material layer 23 may be, for example, a metal foil having a thickness in this range.

In the all-solid secondary battery 1, the second anode active material layer 23 is disposed between the anode current collector 521 and the first anode active material layer 22 before assembly of the all-solid secondary battery 1 or is deposited between the anode current collector 521 and the first anode active material layer 22 by charging after assembly of the all-solid secondary battery 1.

When the second anode active material layer 23 is disposed between the anode current collector 521 and the first anode active material layer 22 before assembly of the all-solid secondary battery 1, the second anode active material layer 23 acts as a lithium reservoir because it is a metal layer containing lithium. The cycle characteristics of the all-solid secondary battery 1 including the second anode active material layer 23 are improved. For example, a lithium foil is disposed between the anode current collector 521 and the first anode active material layer 22 before assembly of the all-solid secondary battery 1.

When the second anode active material layer 23 is disposed by charging after assembly of the all-solid secondary battery 1, the energy density of the all-solid secondary battery 1 increases because the second anode active material layer 23 is not included at the time of assembly of the all-solid secondary battery 1. For example, when charging the all-solid secondary battery 1, the all-solid secondary battery 1 is charged in excess of the charging capacity of the first anode active material layer 22. That is, the first anode active material layer 22 is overcharged. At the initial stage of charging, lithium is absorbed in the first anode active material layer 22. That is, the anode active material included in the first anode active material layer 22 forms an alloy or a compound with lithium ions transferred from the cathode layer 10. When the all-solid secondary battery 1 is charged in excess of the charge capacity of the first anode active material layer 22, for example, lithium is deposited on the rear surface of the first anode active material layer 22, that is, between the anode current collector 521 and the first anode active material layer 22, and a metal layer corresponding to the second anode active material layer 23 is formed by the deposited lithium. The second anode active material layer 23 is a metal layer primarily including lithium (that is, lithium metal). Such a result is obtained because the anode active material included in the first anode active material layer 22 is composed of a material forming an alloy or a compound with lithium. During discharge, lithium included in the first anode active material layer 22 and the second anode active material layer 23 is ionized and transferred toward the cathode layer 10. Therefore, it is possible to use lithium as the anode active material in the all-solid secondary battery 1. When the first anode active material layer 22 covers the second anode active material layer 23, the first anode active material layer 22 serves as a protective layer of the second anode active material layer 23, that is, as a metal layer, and at the same time, serves to suppress the precipitation growth of lithium dendrite. Therefore, the possibility of a short circuit and capacity reduction of the all-solid secondary battery 1 are suppressed, and as a result, the cycle characteristics of the all-solid secondary battery 1 are improved. Further, when the second anode electrode active material layer 23 is disposed by charging after assembly of the all-solid secondary battery 1, the area between the anode current collector 521 and the first anode active material layer 22 is a Li-free area not including a lithium (Li) metal or a lithium (Li) alloy in the initial state or discharged state of the all-solid-state secondary battery.

In the all-solid secondary battery according to an embodiment, the anode active material layer may include a solid electrolyte. The solid electrolyte of the anode active material layer may have a different particle diameter range from the solid electrolyte used in the solid electrolyte layer. The solid electrolyte used in the anode active material layer may have a smaller average particle diameter than the solid electrolyte used in the solid electrolyte layer.

The average particle diameter of the solid electrolyte used in the anode active material layer is about 100 nm to about 10 μm, about 300 nm to about 8 μm, or about 500 nm to about 5 μm, and the average particle diameter of the solid electrolyte used in the solid electrolyte layer is about 500 nm to about 20 μm, about 700 nm to about 15 μm, or about 900 nm to about 10 μm.

Method of Manufacturing all-Solid Secondary Battery

Heretofore, the configuration of the lithium ion secondary battery 1 has been described in detail. Subsequently, a method of manufacturing the all-solid secondary battery 1 having the above-described configuration will be described. The all-solid secondary battery 1 may be manufactured by preparing the cathode layer 10, the anode layer 20, and the solid electrolyte layer 30 and then laminating these layers. Hereinafter, each process will be described in more detail.

Process of Preparing Cathode Layer

A method of preparing the cathode layer 10 will be described. The method of preparing the cathode layer 10 is not particularly limited, and, for example, the cathode layer 10 may be prepared by the following process.

First, a cathode active material particle 11A such as NCA (lithium nickel cobalt aluminum oxide) or NCM (lithium nickel cobalt manganese oxide) is prepared, and a coating layer 11B is formed on a surface of the cathode active material particle 11A.

The coating layer 11B is prepared using a slurry for coating, which is a mixed solution obtained by adding lithium acetate and trialkyl borate having 9 to 20 carbon atoms to a solvent and heating and dissolving the resultant.

As the solvent, alcohols such as methanol and ethanol are used, and alcohols in an anhydrous state or a super dehydrated state may be used.

When the number of carbon atoms in trialkyl borate is less than 9 or more than 20, it is difficult to obtain a uniform coating layer composition. When a non-uniform coating layer composition is used, the resistance of the cathode layer is increased, which is not preferable. As a result, it is difficult to obtain a cathode active material having a coating layer containing an acetate.

Examples of the trialkyl borate having 9 to 20 carbon atoms may include triisopropyl borate, tripropyl borate, tributyl borate, tripentyl borate, and trihexyl borate.

The mixed weight ratio of lithium acetate and trialkyl borate is about 1:5 to about 1:15, about 1:8 to about 1:13, or about 1:9 to about 1:11. When the mixed weight ratio of lithium acetate and trialkyl borate is within these ranges, the composition other than an acetate in the coating layer 11B may include $Li_3N_{11}O_{18}$.

Subsequently, the surface of the cathode active material particle 11A is coated with the slurry for coating. In this case, after forming the coating layer 11B on the cathode active material particles 11A, the coating amount of the coating layer 11B to the cathode active material particle 11A is adjusted to about 0.01 mol % to about 2.0 mol %, based on 100 mol % of non-coated cathode active material particles.

When using boric acid or triethyl borate, instead of trialkyl borate, to react with lithium acetate, it is difficult to obtain a uniform coating layer composition, and boric acid or triethyl borate is thermally decomposed in the heat-treatment step during the process of preparing a composite cathode active material having a coating layer. Thus it is difficult to obtain a composite cathode active material having the coating layer containing an acetate.

Subsequently, for example, after the slurry for coating is applied to cover the entire surface of the cathode active material particle 11A, the solvent is removed by volatilization using an evaporator or the like, and then the slurry is heat-treated under an atmosphere to obtain a cathode active material 11. The heat-treatment temperature is about 200° C. to about 400° C., for example, about 300° C. to about 350° C.

When the heat-treatment temperature is lower than about 200° C. or higher than about ° C., it is difficult to obtain a composite cathode active material having the coating layer containing an acetate. Particularly, when the heat-treatment temperature is higher than about 400° C., an acetate, such as lithium acetate used as a starting material for the coating layer, may be decomposed by heat.

The heat-treatment time may be changed depending on the heat-treatment temperature, and may be adjusted, for example, in the range of 0.5 to 3 hours, or 1 hour.

A slurry is prepared by adding the composite cathode active material 11, a binder, and the like, which are materials for forming the cathode layer 11, to a non-polar solvent. The slurry may be in a paste state.

Subsequently, the obtained slurry is applied onto the cathode current collector and dried. Subsequently, the obtained laminate is pressed, thereby preparing a cathode layer 10.

The pressing may be, for example, pressing using hydrostatic pressure. This pressing process may be omitted. The mixture of materials constituting the cathode layer 10 may be compacted into a pellet shape, or may be spread in a sheet shape to prepare the cathode layer 10. When the cathode layer 10 is prepared in this way, the cathode current collector may be omitted.

Process of Preparing Solid Electrolyte Layer

The solid electrolyte layer 30 may be prepared by a solid electrolyte 31 formed of a solid electrolyte material containing sulfur.

First, the starting materials are treated by a melt quenching method or a mechanical milling method.

For example, when using a melt quenching method, the starting materials (for example, $Li_2S$, $P_2S_5$, and the like) are mixed in a predetermined amount to form pellets, the pellets are reacted in a vacuum at a predetermined reaction temperature, followed by quenching thereby preparing a solid electrolyte material. The reaction temperature of the mixture of $Li_2S$ and $P_2S_5$ is about 400° C. to about 1000° C., for example, about 800° C. to about 900° C. The reaction time is about 0.1 hour to about 12 hours, or about 1 hour to about 12 hours. The quenching temperature of the reactants is 10° C. or lower, for example, 0° C. or lower, and the quenching rate thereof is about 1° C./sec to about 10000° C./sec, for example, about 1° C./sec to about 1000° C./sec.

Further, when using a mechanical milling method, the starting materials (for example, $Li_2S$, $P_2S_5$, and the like) are reacted by stirring using a ball mill to prepare a solid electrolyte material. The stirring speed and stirring time in the mechanical milling method are not particularly limited. The faster the stirring speed, the faster the production rate of the solid electrolyte material, and the longer the stirring time, the higher the conversion rate of the starting material to the solid electrolyte material.

Thereafter, the mixed starting material obtained by the melt quenching method or the mechanical milling method is heat-treated at a predetermined temperature, and then pulverized to prepare a particulate solid electrolyte 31. When the solid electrolyte 31 has a glass transition point, the solid electrolyte 31 may change from amorphous to crystalline by heat-treatment.

Subsequently, the solid electrolyte 31 obtained by the above method is deposited using a known film forming method such as an aerosol deposition method, a cold spray method, or a sputtering method, thereby preparing a solid electrolyte layer 30. The solid electrolyte layer 30 may be prepared by pressing the particles of the solid electrolyte 31. The solid electrolyte layer 30 may also be prepared by mixing the solid electrolyte 31 with a solvent and a binder, applying and drying the mixed solution, and then pressing the resultant product.

Process of Preparing Anode Layer

Next, a method of preparing the anode layer 20 will be described. The method of preparing the anode layer 20 is not particularly limited, and, for example, the anode layer 20 may be prepared by the following process.

When a metal foil containing lithium is used as the anode active material 21, for example, a metal foil containing lithium, such as a lithium metal foil, is superimposed on the anode current collector and pressed, thereby preparing an anode layer 20.

When using the anode active material 21 other than lithium metal foil, for example, materials constituting the anode layer 20 (anode active material particles 21, solid electrolyte 31, a binder, and the like) are added to a polar solvent or a non-polar solvent, thereby preparing a slurry. Subsequently, the obtained slurry is applied onto the anode current collector and dried. Subsequently, the obtained laminate is pressed (for example, pressing using hydrostatic pressure is performed), thereby preparing the anode layer 20. The pressing process may be omitted. The anode layer 20 may be prepared by pressing a mixture of materials constituting the anode layer 20.

Lamination of Layers

The cathode layer 10, the solid electrolyte layer 30, and the anode layer 20, obtained as described above, are laminated in this order, and pressed, thereby manufacturing the all-solid secondary battery 1 according to the present embodiment.

Effects

According to the aforementioned method of preparing the composite cathode active material 11 and the aforementioned method of manufacturing the all-solid secondary battery 1, when the heat-treatment temperature at the time of forming the coating layer 11B is set to about 200° C. to about 400° C., for example, about 350° C., an acetate, such as lithium acetate, used as a starting material for the coating layer 11B is not decomposed by heat, and is present in the coating layer 11B at a content of about 70 mol % or more.

When the coating layer 11B includes an acetate in an amount of about 70 mol % or more, battery characteristics such as load characteristics and cycle characteristics of the all-solid-state secondary battery 1 may be remarkably improved. In particular, when a high voltage of 4 V or more is applied, an increase in interfacial resistance may be greatly reduced, and cycle characteristics may be improved, as compared with other coating layers.

Further, in the process of preparing the coating layer 11B coating the cathode active material particle 11A, since the heat-treatment temperature is lower than about 500° C., even when a special manufacturing apparatus is not provided, the composite cathode active material 11 and the all-solid secondary battery 1 may be manufactured using a suitable apparatus.

When the cathode active material particle 11A has a particulate form and the entire surface thereof is covered with the coating layer 11B, the generation of resistance components at the interface between the cathode active material particle 11A and the solid electrolyte 31 may be suppressed.

When the cathode active material particle 11A includes a ternary lithium transition metal oxide having a layered rock salt structure as described above, the energy density and thermal stability of the all-solid-state secondary battery 1 may be improved.

When the cathode active material particle 11A is formed of a ternary lithium transition metal oxide such as NCA or NCM and includes nickel (Ni), the capacity density of the all-solid-state secondary battery 1 may be increased, and metal elution from the cathode active material particle 11A in a charged state may be reduced. Accordingly, the all-solid secondary battery 1 according to the present embodiment can improve long-term reliability and cycle characteristics.

The thermal weight loss of the composite cathode active material for the all-solid secondary battery from about 300° C. to about 500° C., for example, about 350° C. to about 500° C., obtained by thermogravimetric analysis, is about 70% to about 95%, about 70% to about 85%, or about 80%.

In an infrared spectrum analysis of the composite cathode active material, a C=O stretching vibration peak in —COO group appears in a doublet format 1200 $cm^{-1}$ to 1700 $cm^{-1}$, and a —OH peak appears at 3000 $cm^{-1}$.

Hereinafter, the present disclosure will be described in detail with reference to the following Examples, but the scope of the present disclosure is not limited to these Examples.

In the following Examples, various types of cathode active materials were prepared, and all-solid secondary batteries were manufactured using these cathode active materials, and load characteristics evaluations and cycle life tests of the all-solid-state secondary batteries were carried out.

EXAMPLES

Example 1

Formation of Coating Layer on Surface of Cathode Active Material Particle $LiNi_{0.5}Co_{0.2}Mn_{0.3}O_2$ (NCM) particles were used as cathode active material particles. Lithium acetate and triisopropyl borate were dissolved in a super dehydrated ethanol solvent heated to 60° C. to obtain a mixed solution (slurry for coating), and coating treatment for the cathode active material particles was performed using this mixed solution (slurry for coating). In the mixed solution, lithium acetate (0.04 g) and triisopropyl borate (0.44 g) were added to 10 g of the cathode active material particles at a weight ratio of lithium acetate to triisopropyl borate that was 1:11 such that the composition other than an acetate in the coating layer was finally $Li_3N_{11}O_{18}$. The slurry for coating was prepared such that the coating amount of $Li_2O$—$B_2O_3$ (LBO) to NCM (that is, the content of $Li_2O$—$B_2O_3$ (LBO) and an acetate to non-coated cathode active material particles NCM) was 0.1 mol % based on 100 mol % of the non-coated cathode active material particles NCM. A solvent was volatilized using an evaporator, and heat-treatment was carried out at 350° C. for 1 hour under an atmosphere, thereby obtaining a composite cathode active material (also referred to as the coated cathode active material) in which an LBO coating layer was formed on the surface of NCM.

Manufacturing of all-Solid Secondary Battery

First, reagents $Li_2S$ and $P_2S_5$ were weighed so as to obtain a target composition $Li_3PS_4$, and then mechanical milling treatment was carried out for 20 hours using planetary ball mill. The mechanical milling treatment was performed for 20 hours in a rotational speed of 380 rpm at room temperature under an argon atmosphere. After the recovered sample was pulverized by an agate mortar, X-ray crystal diffraction was performed, whether there is no remaining crystal layer was confirmed, and this material was used as a solid electrolyte. The cathode active material coated with LBO (composite cathode active material), a solid electrolyte (SE), and carbon nano fiber (CNF), which is a conductive material, were mixed at a weight ratio of 60:35:5 by wt % to prepare a cathode layer. Further, graphite, $Li_3PS_4$, which is a solid electrolyte, and vapor grown carbon fiber (VGCF), which is a conductive material, were mixed at a weight ratio of 60:35:5 by wt % to prepare an anode layer. The cathode layer (15 mg), the solid electrolyte (100 mg), and the anode layer (15 mg) were sequentially laminated and pressed at a pressure of 3 ton/cm$^2$ to obtain a test cell (all-solid secondary battery).

Evaluation of Load Characteristics

The obtained test cell was charged to an upper limit voltage of 4.3 V with a constant current of 0.05 C at 25° C., and then discharged to a lower limit voltage of 2.5 V with a constant current of 0.05 C to measure an initial discharge capacity. Then, a discharge was performed by constant currents of 0.05 C, 0.5 C, and 1 C to measure characteristics for each rate. The ratio of the 1 C discharge capacity to the initial discharge capacity was used as an index of load characteristics. The higher this value, the smaller the internal resistance of the battery and the better the load characteristics of the battery. The results of the load characteristic evaluation test are shown in Table 1.

Cycle Life Test

The charge-discharge cycle in which the obtained test cell is charged to an upper limit voltage of 4.3 V with a constant current of 0.05 C at 25° C., and then discharged to a discharge termination voltage of 2.5 V with a constant current of 0.05 C was repeated 50 cycles. The ratio of the discharge capacity of 50 cycles to the discharge capacity of 1 cycle was defined as a discharge capacity retention rate. The discharge capacity retention rate is a parameter indicating cycle characteristics, and the larger the value, the better the cycle characteristics. The results of cycle life test are shown in Table 1.

Example 2

A composite cathode active material and a test cell were manufactured in the same manner as in Example 1, except that the coating amount of Li$_2$O—B$_2$O$_3$ (LBO) to NCM (that is, the content of Li$_2$O—B$_2$O$_3$ (LBO) and an acetate to non-coated cathode active material particles NCM) was 0.2 mol %, based on 100 mol % of the non-coated cathode active material particles NCM.

Load characteristic evaluation and cycle life test were performed using this test cell in the same order as in Example 1. The results of this test are shown in Table 1.

Example 3

A composite cathode active material and a test cell were manufactured in the same manner as in Example 1, except that the coating amount of Li$_2$O—B$_2$O$_3$ (LBO) to NCM (that is, the content of Li$_2$O—B$_2$O$_3$(LBO) and an acetate to non-coated cathode active material particles NCM) was 0.3 mol %, based on 100 mol % of the non-coated cathode active material particles NCM. Load characteristic evaluation and cycle life test were performed using this test cell in the same order as in Example 1. The results of this test are shown in Table 1.

Example 4

A composite cathode active material and a test cell were manufactured in the same manner as in Example 1, except that the coating amount of Li$_2$O—B$_2$O$_3$ (LBO) to NCM (that is, the content of Li$_2$O—B$_2$O$_3$ (LBO) and an acetate to non-coated cathode active material particles NCM) was 0.4 mol %, based on 100 mol % of the non-coated cathode active material particles NCM. Load characteristic evaluation and cycle life test were performed using this test cell in the same order as in Example 1. The results of this test are shown in Table 1.

Example 5

A composite cathode active material and a test cell were manufactured in the same manner as in Example 1, except that the coating amount of Li$_2$O—B$_2$O$_3$ (LBO) to NCM (that is, the content of Li$_2$O—B$_2$O$_3$ (LBO) and an acetate to non-coated cathode active material particles NCM) was 0.5 mol %, based on 100 mol % of the non-coated cathode active material particles NCM. Load characteristic evaluation and cycle life test were performed using this test cell in the same order as in Example 1. The results of this test are shown in Table 1.

Example 6

A composite cathode active material and a test cell were manufactured in the same manner as in Example 1, except that the coating amount of Li$_2$O—B$_2$O$_3$ (LBO) to NCM (that is, the content of Li$_2$O—B$_2$O$_3$ (LBO) and an acetate to non-coated cathode active material particles NCM) was 0.75 mol %, based on 100 mol % of the non-coated cathode active material particles NCM. Load characteristic evaluation and cycle life test were performed using this test cell in the same order as in Example 1. The results of this test are shown in Table 1.

Example 7

A composite cathode active material and a test cell were manufactured in the same manner as in Example 1, except that the coating amount of Li$_2$O—B$_2$O$_3$ (LBO) to NCM (that is, the content of Li$_2$O—B$_2$O$_3$ (LBO) and an acetate to non-coated cathode active material particles NCM) was 1.0 mol %, based on 100 mol % of the non-coated cathode active material particles NCM. Load characteristic evaluation and cycle life test were performed using this test cell in the same order as in Example 1. The results of this test are shown in Table 1.

Comparative Example 1

A cathode active material and a test cell were manufactured in the same manner as in Example 1, except that the heat-treatment temperature was changed to 500° C. when preparing a cathode active material (called a coated cathode active material) in which the surface of NCM was coated with LBO. Load characteristic evaluation and cycle life test were performed using this test cell in the same order as in Example 1. The results of this test are shown in Table 1.

Comparative Example 2

In Comparative Example 2, a test cell was manufactured in the same manner as in Example 1, except that, instead of the cathode active material, cathode active material particles (NCM) that did not undergo any coating treatment were used as they are. Load characteristic evaluation and cycle life test were performed using this test cell in the same order as in Example 1. The results of this test are shown in Table 1.

TABLE 1

|  | Initial discharge capacity (mAh/g) | Rate characteristics (1 C/0.05 C) | Cycle characteristics |
|---|---|---|---|
| Example 1 | 143 | 22.8% | 65.1% |
| Example 2 | 150 | 55.5% | 63.6% |
| Example 3 | 146 | 47.7% | 83.7% |
| Example 4 | 156 | 53.9% | 83.2% |
| Example 5 | 154 | 54.6% | 85.8% |
| Example 6 | 153 | 52.8% | 84.0% |
| Example 7 | 156 | 51.1% | 83.9% |
| Comparative Example 1 | 101 | 1.4% | 59.2% |
| Comparative Example 2 | 122 | 19.5% | 65.3% |

Example 8

Formation of coating layer on surface of cathode active material particle $LiNi_{0.8}Co_{0.1}Mn_{0.1}O_2$ (NCM) particles were used as cathode active material particles.

A slurry for coating was prepared in the same manner as in Example 1, except that the coating amount of $Li_2O$—$B_2O_3$ (LBO) to NCM (that is, the total content of $Li_2O$—$B_2O_3$ (LBO) and an acetate to non-coated cathode active material particles NCM) was 0.03 mol %, based on 100 mol % of the non-coated cathode active material particles NCM. A solvent was volatilized using an evaporator, and heat-treatment was carried out at 350° C. for 1 hour under an air atmosphere, thereby obtaining a cathode active material (composite cathode active material) having an LBO coating layer on the surface thereof.

Preparation of Solid Electrolyte

First, reagents $Li_2S$, $P_2S_5$, and LiCl, which are start materials of an electrolyte material containing sulfur, were weighed so as to obtain a target composition $Li_6PS_5Cl$. Subsequently, these reagents were subjected to mechanical milling treatment using planetary ball mill for 20 hours. The mechanical milling treatment was performed in a rotational speed of 380 rpm at room temperature (25° C.) under an argon atmosphere.

800 mg of powder sample of the composition $Li_6PS_5Cl$ obtained by the mechanical milling treatment was pressed (pressure: 400 MPa/cm$^2$) to obtain a pellet having a diameter of 13 mm and a thickness of about 0.8 mm. The obtained pellet was covered with a gold foil, and put into a carbon crucible to prepare a sample for heat-treatment. The obtained sample for heat-treatment was vacuum-sealed in a quartz glass tube. Subsequently, the sample for heat-treatment was put into an electric furnace, and the temperature in the electric furnace was increased from room temperature to 550° C. at a temperature increase rate of 1.0° C./min. Subsequently, the sample for heat-treatment was heat-treated at 550° C. for 6 hours. Subsequently, the sample for heat-treatment was cooled to room temperature (25° C.) at a temperature decrease rate of 1.0° C./min. The sample recovered after the heat-treatment was pulverized by an agate mortar. The pulverized sample was subjected to X-ray crystal diffraction, and it was confirmed that targeted argyrodite-type crystals were formed.

Manufacturing of all-Solid Secondary Battery

The cathode active material coated with LBO, an argyrodite-type solid electrolyte, and carbon nano fiber (CNF), which is a conductive material, were mixed at a weight ratio of 83:15:3 to prepare a cathode layer. As an anode, a metal Li foil (thickness: 30 μm) was used. The cathode layer (10 mg), the solid electrolyte (150 mg), and the metal Li foil were sequentially laminated and pressed at a pressure of 3 ton/cm$^2$ to obtain a test cell.

Load characteristic evaluation and cycle life test were performed using this test cell in the same order as in Example 1. The results of this test are shown in Table 2.

Example 9

A composite cathode active material and a test cell were manufactured in the same manner as in Example 8, except that the coating amount of $Li_2O$—$B_2O_3$ (LBO) to NCM (that is, the total content of $Li_2O$—$B_2O_3$ (LBO) and an acetate to non-coated cathode active material particles NCM) was 0.07 mol %, based on 100 mol % of the non-coated cathode active material particles NCM. Load characteristic evaluation and cycle life test were performed using this test cell in the same order as in Example 1. The results of this test are shown in Table 2.

Example 10

A composite cathode active material and a test cell were manufactured in the same manner as in Example 8, except that the coating amount of $Li_2O$—$B_2O_3$ (LBO) to NCM (that is, the total content of $Li_2O$—$B_2O_3$ (LBO) and an acetate to non-coated cathode active material particles NCM) was 0.1 mol %, based on 100 mol % of the non-coated cathode active material particles NCM. Load characteristic evaluation and cycle life test were performed using this test cell in the same order as in Example 1. The results of this test are shown in Table 2.

Example 11

$LiNi_{0.8}Co_{0.1}Mn_{0.1}O_2$ (NCM) particles, which are the same as those used in Example 8, were used as cathode active material particles. The surface of the NCM particle was coated with a mixed solution of lithium methoxide, zirconium propoxide, and ethanol.

The mixed solution was adjusted such that the coating amount of $Li_2O$—$ZrO_2$ (LZO) to NCM (that is, the total content of $Li_2O$—$ZrO_2$ (LZO) to non-coated cathode active material particles NCM) was 0.25 mol %, based on 100 mol % of the non-coated cathode active material particles NCM. The mixed solution was prepared by adding 9.7 g of lithium methoxide and 6.1 g of zirconium propoxide to ethanol with respect to 500 g of a cathode active material such that the composition in the coating layer was finally $Li_2ZrO_3$. The mixed solution was sprayed and dried to perform surface coating treatment for the cathode active material. The surface coating treatment was performed using an electric fluidized bed assembling and coating machine FD-MP-01E manufactured by Paurek Co., Ltd. The surface coating treatment was performed under conditions of the amount of cathode active material particles 500 g, air supply temperature 90° C., air supply flow rate 0.23 m$^3$/h, rotor rotation speed 400 rpm, atomized air flow rate 50 NL/min, and spray rate about 5 g/min to obtain a cathode active material having an LZO coating layer.

An LBO coating layer was formed on the cathode active material having an LZO coating layer. In this case, a slurry for coating was prepared in the same manner as in Example 1, except that the coating amount of $Li_2O$—$B_2O_3$ (LBO) to NCM was changed to 0.03 mol %. In the same manner as in Example 1, heat-treatment was performed at 350° C. for 1 hour under an air atmosphere to obtain a cathode active material (composite cathode active material) having two coating layers of an LZO coating layer and an LBO coating layer. A test cell was manufactured using the cathode active material in which the surface of the cathode active material particle is covered by two coating layers in the same manner as in Example 8. Load characteristic evaluation and cycle life test of this test cell were performed using the same manner as in Example 1. The results of this test are shown in Table 2.

Example 12

Example 12 was carried out in the same manner as in Example 11, the coating amount of $Li_2O$—$B_2O_3$ (LBO) to NCM (that is, the content of $Li_2O$—$B_2O_3$ (LBO) and an acetate to non-coated cathode active material particles NCM) was adjusted to be 0.25 mol %, based on 100 mol % of the non-coated cathode active material particles NCM. The cathode active material having been subjected to coating was heat-treated at 300° C. Other procedures were performed in the same manner as in Example 8 to prepare a composite cathode active material and a test cell. Load characteristic evaluation and cycle life test were performed using this test cell in the same order as in Example 8. The results of this test are shown in Table 2.

Comparative Example 3

In Comparative Example 3, a test cell was manufactured in the same manner as in Example 8, except that, instead of the cathode active material, cathode active material particles (NCM) that did not undergo any coating treatment were used as they are. Load characteristic evaluation and cycle life test were performed using this test cell in the same order as in Example 8. The results of this test are shown in Table 2.

TABLE 2

|  | Initial discharge capacity (mAh/g) | Rate characteristics (1 C/0.05 C) | Cycle characteristics |
| --- | --- | --- | --- |
| Example 8 | 222 | 84.2% | 86.3% |
| Example 9 | 221 | 83.9% | 83.1% |
| Example 10 | 228 | 83.5% | 82.0% |
| Example 11 | 218 | 86.4% | 93.4% |
| Example 12 | 216 | 84.5% | 83.8% |
| Comparative Example 3 | 206 | 73.0% | 76.8% |

Example 13

For the purpose of analyzing the coating materials containing lithium (Li) and boron (B) of Examples 1 to 11, a coating material was synthesized. Lithium acetate and triisopropyl borate were dissolved in a super-dehydrated ethanol solvent heated to 60° C. so as to have the same composition as in Example 1 to obtain a mixed solution, and the mixed solution was stirred for 3 hours. The stirred mixed solution was heat-treated at 350° C. for 1 hour using an electric furnace to remove a solvent, dried, and then analyzed using Fourier transform infrared absorption spectroscopy. Further, sample before heat-treatment was analyzed using a thermogravimetric apparatus. The analysis results are shown in FIGS. 3 and 4, respectively.

Comparative Example 4

For the purpose of analyzing the coating material containing lithium (Li) and boron (B) of Comparative Example 2, a coating material was synthesized. Lithium acetate and triisopropyl borate were dissolved in a super-dehydrated ethanol solvent heated to 60° C. so as to have the same composition as in Example 1 to obtain a mixed solution, and the mixed solution was stirred for 3 hours. The stirred mixed solution was heat-treated at 500° C. for 1 hour using an electric furnace to remove a solvent, dried, and then IR-analysis was performed using Fourier transform infrared absorption spectroscopy. The results are shown in FIG. 3.

Figure 3:
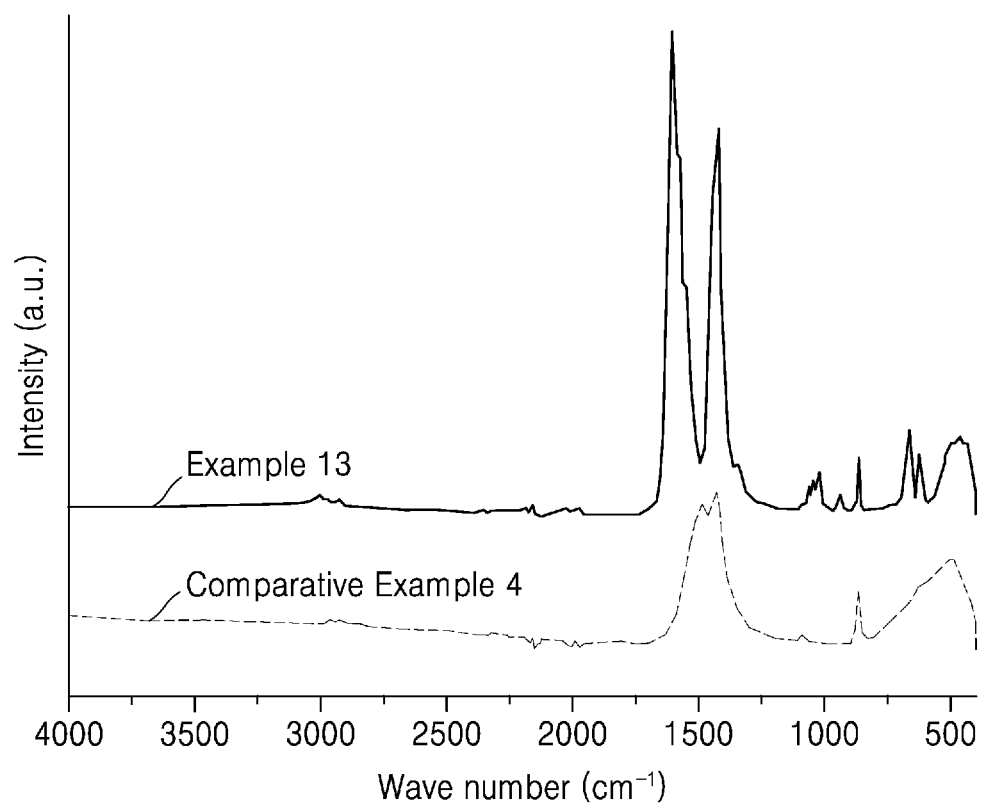
FIG. 3 is a graph of intensity (arbitrary units, a.u.) versus wavelength ($cm^{-1}$), illustrating the results of infrared spectra of coating layers according to Example 1 and Comparative Example 1.
Figure 4:
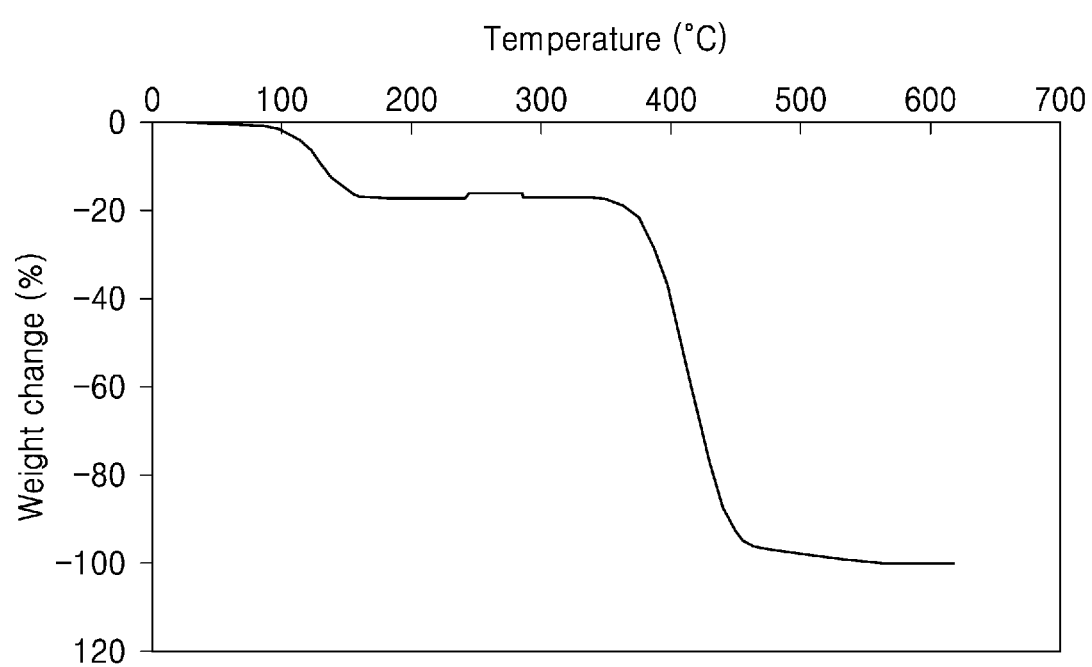
FIG. 4 is a graph of weight change (%) versus temperature (° C.) illustrating the results of thermogravimetric analysis of a slurry for forming the coating layer according to Example 1.

From the results of FIG. 3, in the infrared spectrum of Example 13, a peak belonging to acetate ions as an organic substance was observed. In more detail, a C=O stretching vibration peak in —COO group appears in a doublet form at 1200 cm$^{-1}$ to 1700 cm$^{-1}$, and a —OH peak appears at 3000 cm$^{-1}$.

In the infrared spectrum of Comparative Example 4, a peak belonging to carbonate ions as an inorganic substance was observed.

From the results of FIG. 3, an acetate derived from lithium acetate in the coating layer was detected in the case of Example 13 where the heat-treatment temperature was 350° C., but an acetate was not detected in the case of Comparative Example 4 where the heat-treatment temperature was 500° C. From the results, it was confirmed that an acetate in the coating layer was decomposed at a heat-treatment temperature between 350° C. and 500° C. Considering the results of thermogravimetric measurement of FIG. 4 together with the results of IR analysis of FIG. 3, it may be predicted that the change in value between 350° C. and 500° C. in FIG. 4 is due to the decomposition of an acetate. In FIG. 4, about 80 wt % of the coating layer is changed between 350° C. and 500° C., from which the content of an acetate may be calculated.

The content of an acetate may be changed by the addition amount or addition ratio of the starting materials of the coating layer such as lithium acetate and triisopropyl borate. In Example 13, as in other Examples, starting materials are added such that the composition of $Li_2O$—$B_2O_3$ (LBO) in the coating layer is $Li_3B_{11}O_{18}$. As such, when the composition of $Li_2O$—$B_2O_3$ (LBO) in the coating layer is $Li_3B_{11}O_{18}$, the composition of LBO is changed by heat-treatment temperature, but an acetate of the same amount as in Example 13 is contained in the coating layer. Further, from the results of FIG. 4, the content of an acetate in the coating layer is changed even by heat-treatment temperature. For example, the content of an acetate is about 95 mol % at a heat-treatment temperature of 300° C., and is about 70 mol % at a heat-treatment temperature of 400° C.

As may be seen from the results of Table 1 and Table 2 above, the battery characteristics of the cathode active materials using the coating materials of Examples 1 to 12 are improved as compared with the characteristics of the all-solid secondary batteries of Comparative Examples 1 to 3. In the all-solid secondary batteries of Examples 1 to 12, as may be seen from the results of FIG. 3 that the presence of an acetate (acetate ions) as an organic substance in the coating layer makes it possible to construct an all-solid secondary battery having improved battery characteristics as compared with Comparative Examples in which the coating layer does not contain an organic substance.

According to an embodiment, a composite cathode active material comprises a coating layer coating the surface of a cathode active material particle and the coating layer comprises an acetate, which thereby greatly improves battery characteristics such as load characteristics and cycle life characteristics of all-solid secondary batteries. Further, since the coating layer includes only an acetate, even when a special manufacturing apparatus is not used, a composite cathode active material and an all-solid secondary battery may be easily manufactured using a suitable apparatus.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. A composite cathode active material comprising:
a cathode active material particle; and
a coating layer on a surface of the cathode active material particle, wherein the coating layer comprises an acetate or acetate salt,
wherein the coating layer comprises a reaction product of lithium acetate and a C9 to C20 trialkylborate.

2. The composite cathode active material of claim 1, wherein a content of the acetate or acetate salt in the coating layer is about 70 mol % to about 95 mol %, based on a total content of the coating layer.

3. The composite cathode active material of claim 1, wherein
the coating layer further comprises at least one of zirconium oxide or boron oxide, and
a total content of the at least one of zirconium oxide or boron oxide in the coating layer is about 2.5 mole percent to about 25 mole percent, based on a total content of the coating layer.

4. The composite cathode active material of claim 3, wherein the coating layer further comprises lithium oxide.

5. The composite cathode active material of claim 4, wherein a total content of lithium oxide and the at least one of zirconium oxide or boron oxide is about 5 mole percent to about 30 mole percent, based on the total content of the coating layer.

6. The composite cathode active material of claim 4, wherein the coating layer comprises zirconium oxide.

7. The composite cathode active material of claim 1, wherein the coating layer comprises
a first coating layer, and
a second coating layer disposed on the first coating layer, wherein the second coating layer comprises the acetate or acetate salt and at least one of boron oxide or lithium oxide.

8. The composite cathode active material of claim 7, wherein the composite cathode active material comprises
a first coating layer comprising the acetate or acetate salt, lithium oxide, and zirconium oxide, and
a second coating layer comprising the acetate or acetate salt and at least one of lithium oxide or boron oxide.

9. The composite cathode active material of claim 1, wherein the cathode active material is in a form of a secondary particle comprising a plurality of the cathode active material particles, and the secondary particle has an average particle diameter of about 20 micrometers or less.

10. The composite cathode active material of claim 9, wherein the cathode active material particle has an average secondary particle diameter of about 10 micrometers or less.

11. The composite cathode active material of claim 1, wherein the coating layer has a thickness of about 0.5 nanometer to about 500 nanometers.

12. The composite cathode active material of claim 1, wherein the cathode active material particle comprises a lithium transition metal oxide having a layered rock salt type structure.

13. The composite cathode active material of claim 1, wherein the cathode active material particle comprises a compound represented by Formula 1:

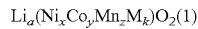

$Li_a(Ni_xCo_yMn_zM_k)O_2$ (1)

wherein, in Formula 1,
M is at least one of boron, magnesium, calcium, strontium, barium, titanium, vanadium, chromium, iron, copper, zirconium, or aluminum, and
$95 \leq a < 1.3$, $0 < x < 1$, $0 < y < 1$, $0 \leq z < 1$, $0 < k < 1$, and $x+y+z+k=1$.

14. The composite cathode active material of claim 1, wherein the cathode active material particle comprises a lithium transition metal oxide represented by at least one of $LiNi_xCo_yAl_zO_2$ or $LiNi_xCo_yMn_zO_2$, wherein x, y, and z are each independently selected and are $0<x<1$, $0<y<1$, $0<z<1$, and $x+y+z=1$.

15. The composite cathode active material of claim 1, wherein a thermal weight loss of the composite cathode active material is about 70 percent to about 95 percent, from about 300° C. to about 500° C., when measured by thermogravimetric analysis.

16. The composite cathode active material of claim 1, wherein, when analyzed by infrared spectroscopy, the composite cathode active material has a C=O stretching vibration peak in a —COO group appears in a doublet form at 1200 cm$^{-1}$ to 1700 cm$^{-1}$, and a —OH peak at 2800 cm$^{-1}$ to 3550 cm$^{-1}$.

17. The composite cathode active material of claim 1, wherein a content of the coating layer in the cathode active material particle is about 0.01 mole percent to about 2 mole percent, based on 100 mole percent of the cathode active material particle.

18. A cathode layer comprising:
the composite cathode active material of claim 1.

19. An all-solid secondary battery comprising:
a cathode layer comprising the composite cathode active material of claim 1;
an anode layer; and
a solid electrolyte layer between the cathode layer and the anode layer.

20. The all-solid secondary battery of claim 19, wherein the cathode layer further comprises a solid electrolyte, and the solid electrolyte comprises sulfur.

21. The all-solid secondary battery of claim 19, wherein the solid electrolyte layer comprises a solid electrolyte, and
the solid electrolyte comprises at least one of $Li_2S$—$P_2S_5$, $Li_2S$—$P_2S_5$—LiX, wherein X is a halogen atom, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, wherein each of m and n are independently a positive number, and Z is at least one of Ge, Zn, or Ga, $Li_2S$—$GeS_2$, $Li_2S$—$SiS_2$—$Li_3PO_4$, $Li_2S$—$SiS_2$—$Li_pMO_q$, wherein each of p and q are independently a positive number, and M is at least one of P, Si, Ge, B, Al, Ga, or In, $Li_{7-x}PS_{6-x}Cl_x$, wherein $0 \leq x \leq 2$, $Li_{7-x}PS_{6-x}Br_x$, wherein $0 \leq x \leq 2$, or $Li_{7-x}PS_{6-x}I_x$, wherein $0 \leq x \leq 2$.

22. The all-solid secondary battery of claim 19, wherein the solid electrolyte layer comprises an argyrodite-type solid electrolyte, and the argyrodite-type solid electrolyte comprises at least one of $Li_{7-x}PS_{6-x}Cl_x$, wherein $0 \leq x \leq 2$, $Li_{7-x}PS_{6-x}Br_x$, wherein $0 \leq x \leq 2$, or $Li_{7-x}PS_{6-x}I_x$, wherein $0 \leq x \leq 2$.

23. A method of preparing a composite cathode active material, the method comprising:
   providing a cathode active material particle;
   disposing lithium acetate and a C9 to C20 trialkyl borate on a surface of the cathode active material particle to provide a coated cathode active material particle; and
   heat-treating the coated cathode active material particle at a temperature of about 200° C. to about 400° C. to prepare the composite cathode active material.

24. The method of claim 23, wherein the C9 to C20 trialkyl borate is at least one of triisopropyl borate, tripropyl borate, tributyl borate, tripentyl borate, or trihexyl borate.

25. The method of claim 23, wherein the heat-treating comprises heat-treating at a temperature of about 300° C. to about 350° C.

26. The method of claim 23, wherein a weight ratio of the lithium acetate to the C9 to C20 trialkyl borate is about 1:5 to about 1:15.

27. The method of claim 23, wherein a content of the lithium acetate and the C9 to C20 trialkyl borate in the coating layer on the cathode active material particle is about 0.01 mole percent to about 2 mole percent, based on 100 mole percent of the cathode active material particle.

28. A composite cathode active material comprising:
   a cathode active material particle; and
   a coating layer on a surface of the cathode active material particle,
   wherein the coating layer comprises a reaction product of lithium acetate and a C9 to C20 trialkylborate, and
   wherein a total content of the coating layer is between about 0.01 mole percent to about 2 mole percent, based on 100 mole percent of the cathode active material particle.

* * * * *